J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 1.
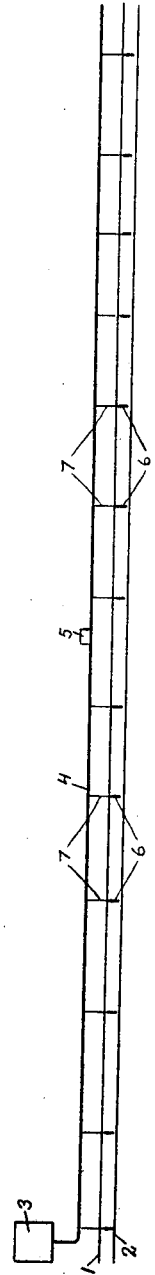
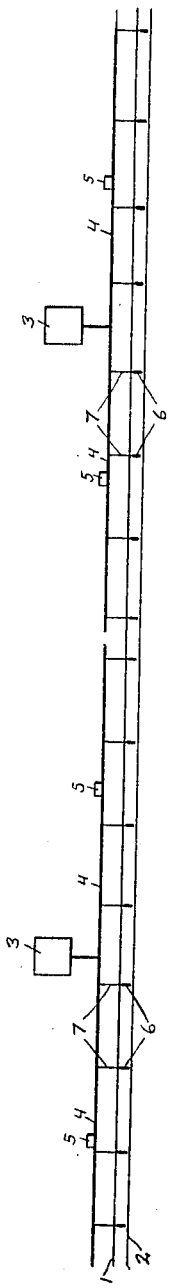
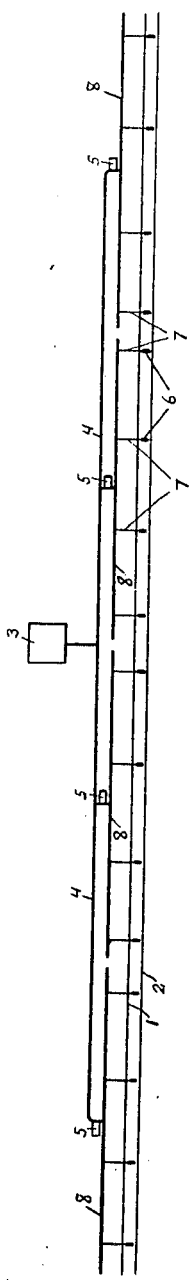
Witnesses:
Inventor:
Julius O. Cobb,
By Winkler, Flanders, Bottum & Howsett
Attorneys.

J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 2.
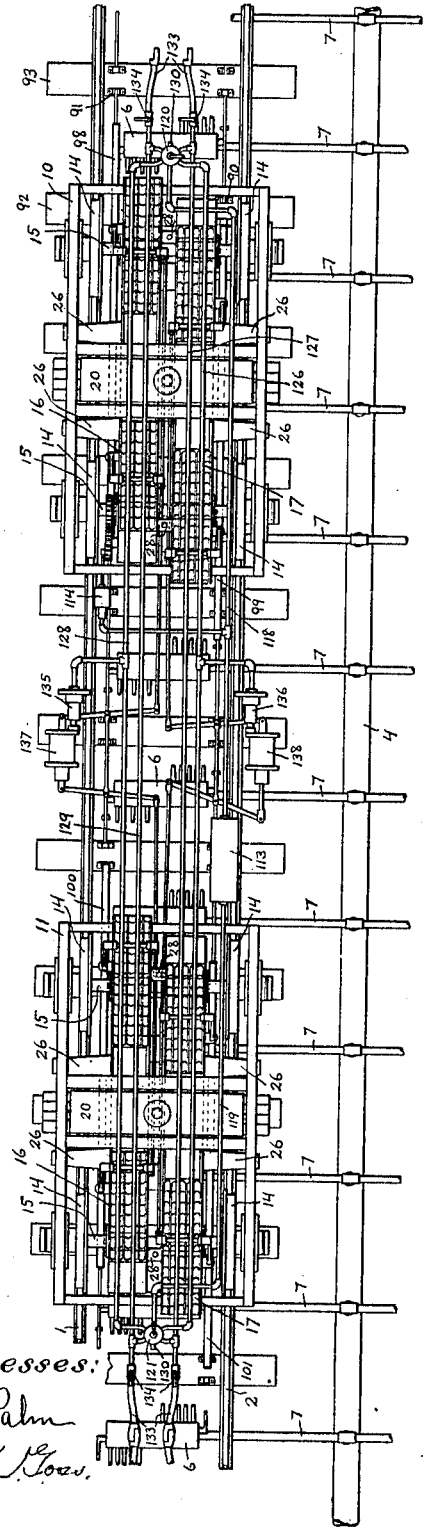
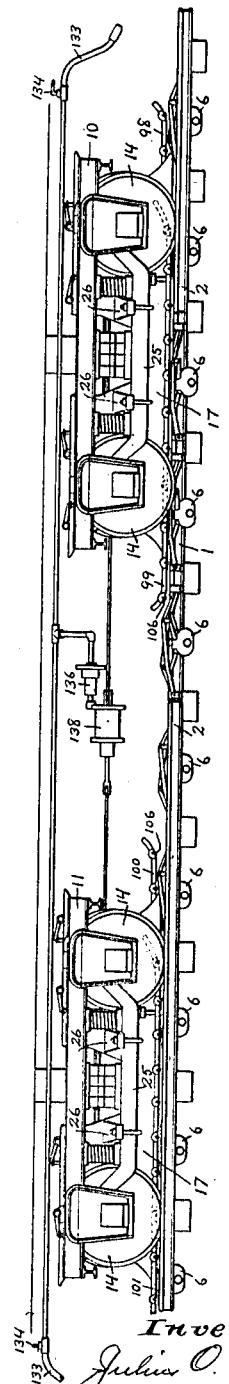

J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 3.
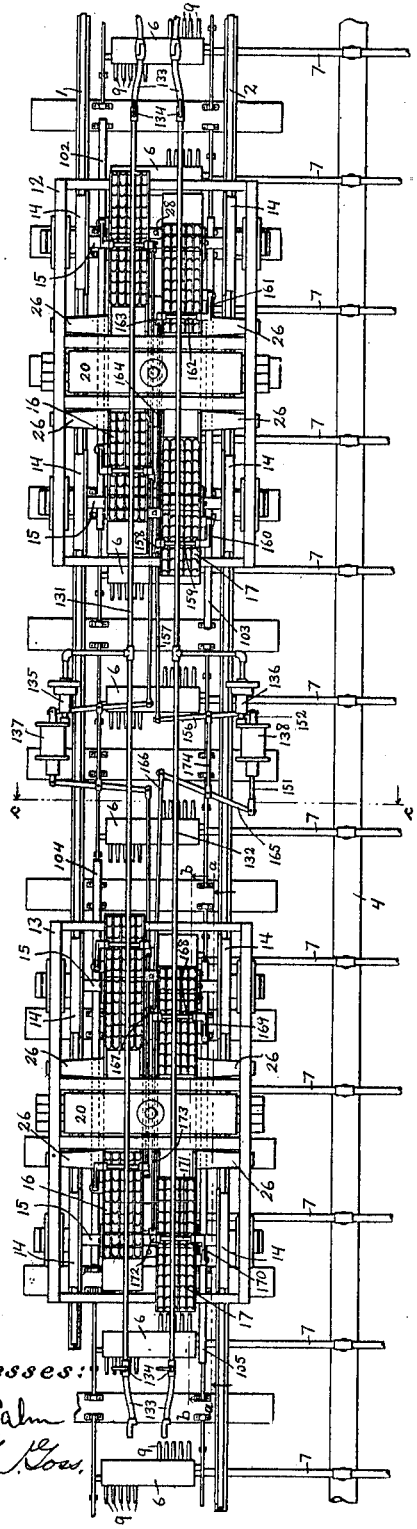
Fig. 5a.
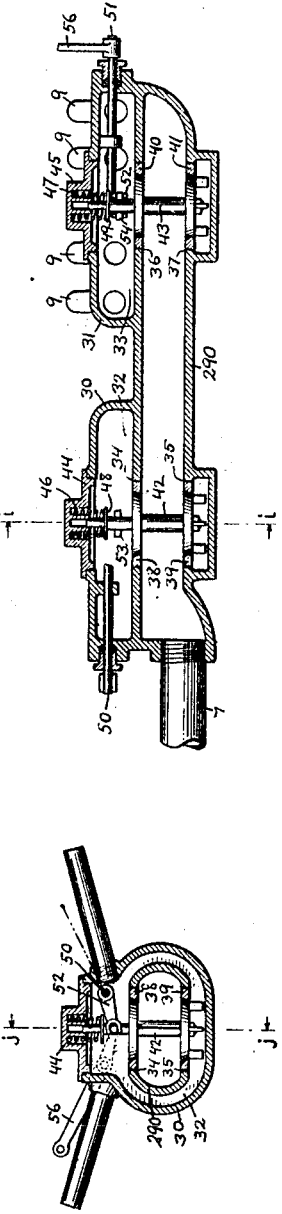
Fig. 21.
Fig. 20.
Witnesses:
Fred Palm
Chas L Goss
Inventor:
Julius O. Cobb,
By Winkler Flanders Bottum & Howsett
Attorneys.

J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 4.
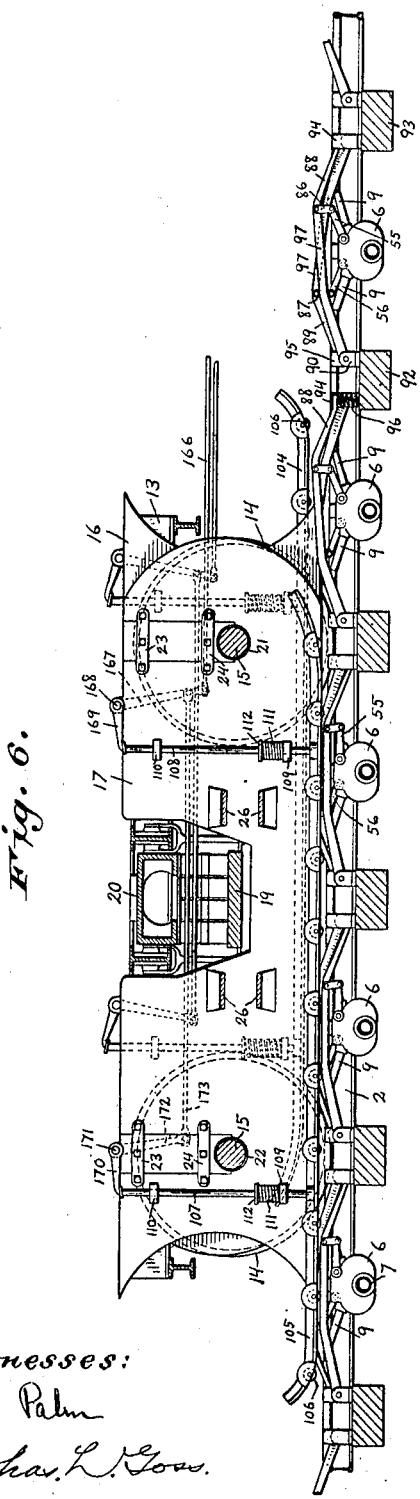
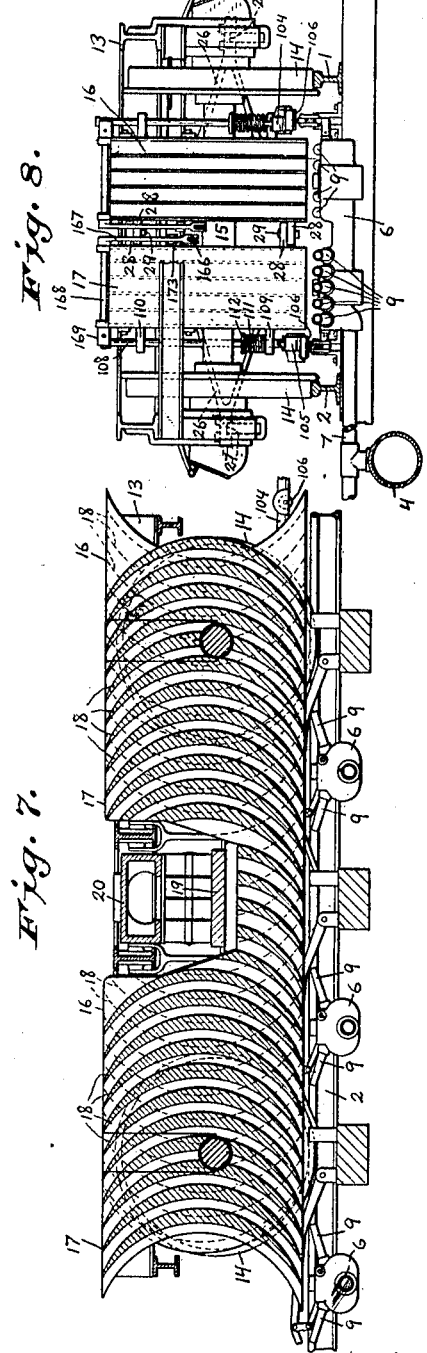
Witnesses:
Fred Palm
Chas. L. Goss.
Inventor:
Julius O. Cobb,
By Winter Flanders Bottum & Fawsett
Attorneys.

J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 5.
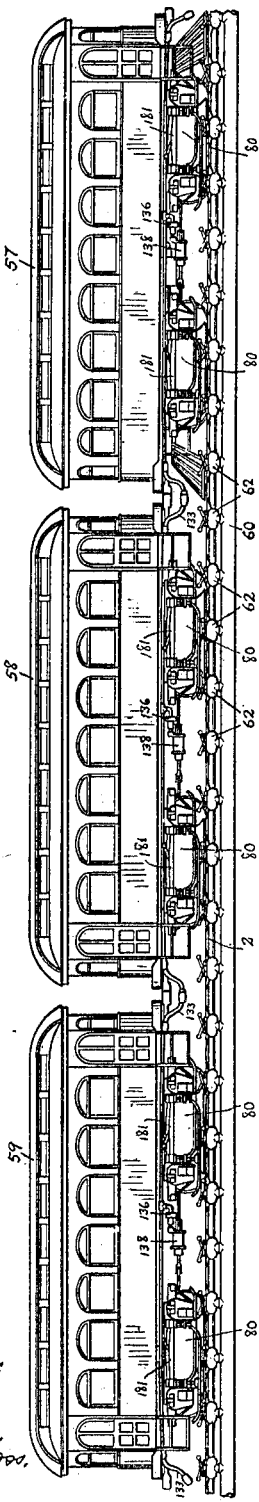
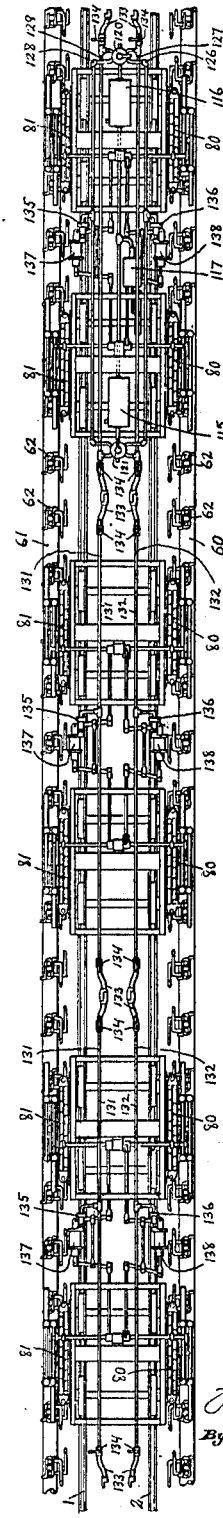

J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 6.
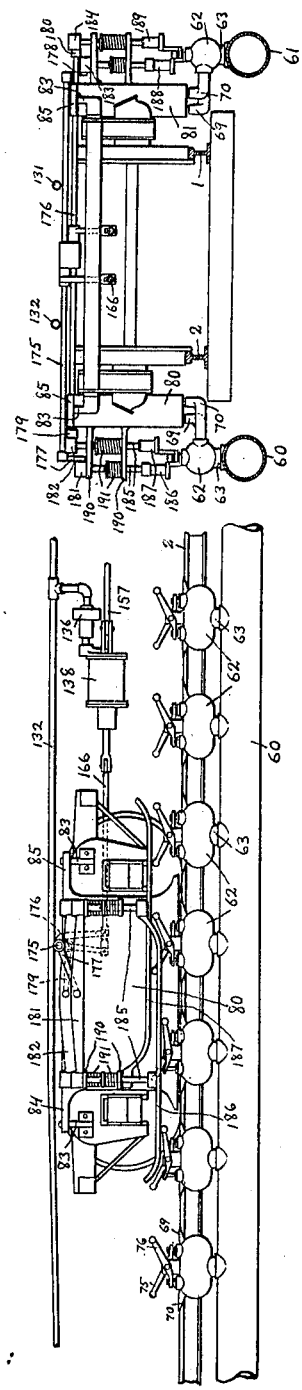

J. O. COBB.
SYSTEM AND APPARATUS FOR PROPELLING VEHICLES BY COMPRESSED AIR.
APPLICATION FILED JAN. 8, 1910.
969,772.
Patented Sept. 13, 1910.
7 SHEETS—SHEET 7.
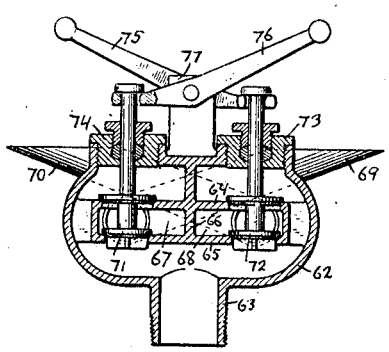
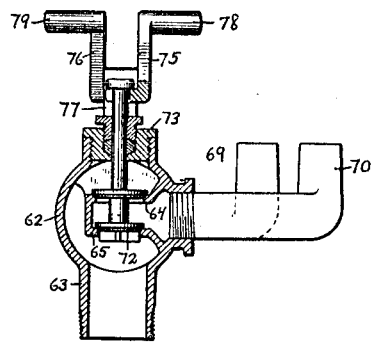
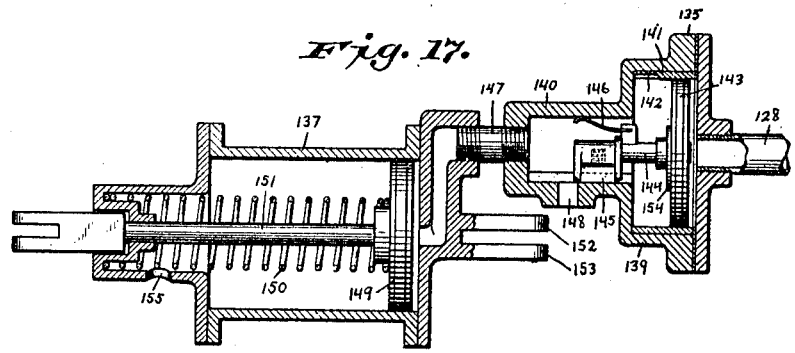
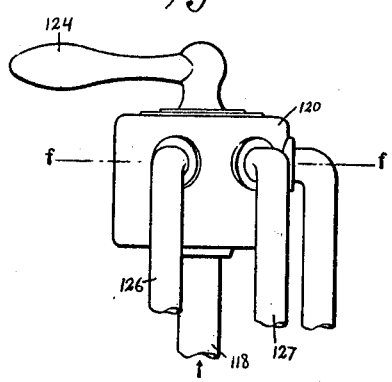
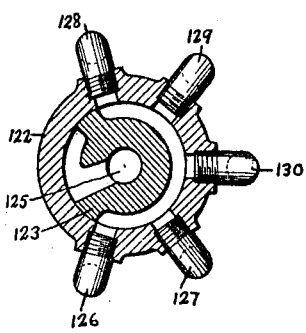

UNITED STATES PATENT OFFICE.

JULIUS O. COBB, OF MILWAUKEE, WISCONSIN.

SYSTEM AND APPARATUS FOR PROPELLING VEHICLES BY COMPRESSED AIR.

969,772. Specification of Letters Patent. Patented Sept. 13, 1910.

Application filed January 8, 1910. Serial No. 537,059.

*To all whom it may concern:*

Be it known that I, JULIUS O. COBB, a citizen of the United States, residing at Milwaukee, in the county of Milwaukee and State of Wisconsin, have invented a certain new and useful System and Apparatus for Propelling Vehicles by Compressed Air, of which the following is a specification, reference being had to the accompanying drawing, forming a part thereof.

This invention relates to a system and organization of apparatus for propelling vehicles by compressed air, as will be pointed out in this specification and the claims.

The smoke nuisance resulting from the use of steam locomotives by railroads has become so intolerable that many cities have either forbidden the use of steam locomotives which burn coal and other smoke producing fuels, or are seriously contemplating the prohibition of the operation of such locomotives within city limits. While different schemes have been suggested from time to time for operating cars without the use of steam locomotives, at the present day and before this invention, the application of electricity appeared to offer the only commercially practicable solution of the problems involved. The application of electricity, however, to the propulsion of cars and similar vehicles, while successful to a certain extent, is open to very serious objections because of the danger to human and animal life from the electric current, owing to the fact that however carefully guarded, insulated, and protected the conductors of electricity are, nevertheless there is constant liability of serious danger, damage and loss of life due to unforeseen and unexpected accidents. Electricity is something that is not capable of being seen or heard, and usually it does not make its presence known except at the instant of inflicting damage to persons or property. For the reasons that electricity is not visible, nor audible, nor capable of making its presence known to ordinary persons except as damage is inflicted, it is a very undesirable and unsafe agent to use, particularly in cities, railroad yards, &c., for the propulsion of cars and vehicles.

Compressed air, when used in the manner pointed out in this specification and the claims, is the ideal cheap, safe and clean medium for use in propelling cars and similar vehicles. The supply of air is of course inexhaustible, it can be used without danger to persons or property, no provision need be made for taking care of it when it is exhausted after having completed its work, and it creates no nuisance. With modern systems of compression by successive stages with cooling between the stages and by reheating, if desired, before use, compressed air affords one of the most economical mediums known for the transmission of power, as it can be cheaply compressed, cheaply reheated, and can be conveyed long distances with very little friction and loss of energy.

This invention contemplates providing railroads with pipes adapted to convey compressed air from a compressor plant or station, said pipes being provided with nozzles adapted to discharge the air under pressure against propelling vanes carried by a car or cars, valves being provided to control the flow of air through said nozzles, said valves being adapted to be operated from a car, or cars, to permit the compressed air to flow from said nozzles against said vanes to propel the car or cars at the will of the engineer.

Referring to the drawings which accompany this specification and form a part thereof, and on which drawings the same reference characters are used to designate the same elements wherever they may appear in each of the several views, and which drawings illustrate embodiments of this invention, Figures 1, 2 and 3 illustrate diagrammatically, layouts of railway tracks, pipe lines, compressor plants and reheating plants; Fig. 4 is an elevation of a car partly broken away, equipped with the preferred form of apparatus embodying this invention; Figs. 5 and 5ª are plan views of a pilot car and trailer, showing the preferred form of apparatus, the car bodies being removed; Fig. 6 is a vertical section taken on the line *a—a* of Fig. 5ª, the apparatus being shown on a larger scale and some parts being omitted; Fig. 7 is a vertical section similar to Fig. 6 taken on the line *b—b* of Fig. 5ª; Fig. 8 is an elevation taken on the line *c—c* of Fig. 5ª, parts being broken away; Fig. 9 is an elevation of a train illustrating a modified construction of apparatus; Fig. 10 is a plan view of the train shown by Fig. 9, the car bodies being omitted; Fig. 11 is an elevation on an enlarged scale of one of the trucks and some of the associated parts of a car shown by Fig. 9; Fig. 12 is a plan view of the truck and associated parts shown by Fig. 11; Fig. 13 is a transverse elevation of the truck shown by Figs. 11 and 12 taken on the line *d—d* of Fig. 12; Fig. 14 is a vertical elevation taken on the line *e—e* of Fig. 12; Fig. 15 is an elevation of the engineer's valve; Fig. 16 is a horizontal section of the engineer's valve taken on the line *f—f* of Fig. 15; Fig. 17 is a vertical section through a skee operating cylinder; Fig. 18 is a vertical section through a valve chamber taken on the line *g—g* of Fig. 12; Fig. 19 is a vertical section through a valve chamber taken on the line *h—h* of Fig. 12, the valves shown by Figs. 18 and 19 being modifications; Fig. 20 is a vertical transverse section of the preferred form of valve casing taken on the line *i—i* of Fig. 21; and Fig. 21 is a vertical section through the preferred form of valve casing taken on the line *j—j* of Fig. 20.

Referring specifically to the drawings, the reference numerals 1 and 2 designate the two rails composing a track in all of the figures.

The numeral 3, Figs. 1, 2 and 3, designates compressor plants or power houses, 4, main pipe lines leading from the compressor plants, 5, reheater plants or stations, 6, valve bodies, and 7, lateral pipes connecting the main supply pipes with the valve bodies.

Of course it is to be understood that the layout for any specific installation will depend upon the physical, economic and other problems encountered with each installation, and the diagrammatic layouts shown by Figs. 1, 2 and 3 are not intended to be exhaustive nor controlling, but are to be considered as suggestive of various schemes of layout. For example, the layout shown by Fig. 1 comprises a compressing plant 3, with a single main supply pipe 4 extending parallel with the rails 1 and 2 composing the track, the compressing station being located at one terminal of the main supply pipe 4; Fig. 2 shows a scheme of layout in which two compressing plants 3, 3, are employed, each being located midway of its own particular block of track, and the main supply pipe 4 from each station is extended in each direction along the track, thus cutting in half the length of main supply pipe to be traversed by the compressed air in supplying a block of track with compressed air. The scheme of layout shown by Fig. 3 shows a single compressor plant 3, with a main supply pipe 4 extended therefrom along the track in both directions, said main supply pipe communicating with block supply pipes 8 about midway of the blocks.

Of course for double tracks, or a plurality of tracks, the main supply pipes can be duplicated, one for each track, or the valve casings for each of the tracks may be supplied from a common supply pipe. It is not considered necessary to illustrate and describe in detail such layouts, as they will be readily understood by engineers, and it will also be understood that the pipes may be on or above or below the surface of the ground or road-bed.

The principle of operation of cars by the use of compressed air under this invention is that the main supply pipes, valve chambers and lateral supply pipes, if used, shall be filled with compressed air, and that a car or cars standing over valves shall be equipped with apparatus by means of which the engineer of the car or train may open and close the valves so that the compressed air will impinge upon vanes carried by the car to move it, or will be shut off, as desired.

The preferred place for the main supply pipe or the block supply pipes is midway between the two rails of a track with the valve casings and nozzles set between the rails, as this location does away with the necessity for laterals connecting the main supply pipes with the valve casings, and reduces the pipe length to be traversed by the compressed air, but in some cases it may be desirable or necessary to extend the main supply pipes at one side of and parallel with the track, and even to place the valve casings outside of the rails. Whichever scheme is adopted, it is essential that the nozzles bear a fixed relation to the rails of the track as regards their height, and it is essential in order to prevent damaging the nozzles that the vane mechanism shall be supported in a fixed position with respect to the nozzles and rails, so that the vane mechanism cannot strike and damage the nozzles. By fixed position of the vane mechanism is meant that it should be so supported as, for example, by the equalizing bars, that it cannot approach nearer than a predetermined distance to the nozzles, but may be free to move away from them if the car wheels run over an obstruction on the track.

As already stated, the preferred location for the valve casings and nozzles is between the rails, and the preferred location of the vane mechanism is between the wheels of the trucks or about the center of the car transversely, and the preferred arrangement of apparatus will now be described.

Referring to Figs. 4 to 8 inclusive of the drawings, the numerals 10, 11, 12 and 13 designate the truck frames upon which two car bodies are mounted. These truck frames are supplied with wheels 14 and axles 15 in the ordinary or any preferred manner, and two vane mechanisms 16 and 17 are supported, preferably by each truck, in any preferred manner, so that they are held a predetermined distance from the nozzles. These vane members may be constructed in any suitable or preferred manner, but it is preferred to construct them of a length substantially equal to the length of the trucks, and one or more sets of vanes are assembled transversely of the car depending upon the number of nozzles which it is desired to use. The vanes of the vane members are preferably of the impulse and reaction type, as clearly shown by Fig. 7 of the drawings, the vanes being designated by the numerals 18. In order that a car may be run either forward or backward, the two vane members 16 and 17 are provided, the vanes of said vane members being curved in opposite directions, as clearly shown by the drawings. This arrangement of the two vane members also provides for a car being turned end for end on the same track so as to run forward and backward, the same as though it had not been turned.

The present design of car trucks can be made to better accommodate the carrying of vane members, as it is desirable to support the vane members from the equalizing bars or some fixed member instead of from the body of the car. The reason for this is that the car body is supported upon springs and moves up and down on uneven tracks, or when obstructions are on the tracks and it is not desirable to have the vane members move down toward the nozzles or approach nearer to them than a predetermined distance.

Figs. 4 to 8 inclusive of the drawings show vane members 16, 17, adapted for use with a class of trucks in common use, the central part of the vane members being cut away so as not to interfere with the spring plank 19, bolster 20, and associated parts of the truck, as clearly shown by Figs. 6 and 7. The vane members 16 and 17 are provided with apertures 21 and 22 through which the axles 15 extend and within which the axles 15 may freely revolve, preferably without actually contacting with the vane members, so that there will be no friction, and no lubrication need be provided for. Parts of the vane members above apertures 21 and 22 may be cut out and removably held in position after the vane members have been assembled with the trucks by any suitable or preferred means, as for example, by straps 23 and 24 and bolts, as shown. The vane members for the reasons already stated, are preferably supported upon the equalizing bars 25 and may be supported thereon by means of projections 26 with which the vane members are provided, the ends of said projections being adapted to seat upon the equalizing bars 25 and to be clamped thereto to hold them firmly in position and so that the endwise thrust of the vane members when in operation, is transmitted to the trucks. These projections 26 may consist of two V-shaped braces, as clearly shown by Fig. 8 of the drawings, and preferably have their ends provided with recesses 27 within which the equalizing bars are received, so that the vane members are prevented from tipping and are held spaced definitely from the equalizing bars. When two separate vane members 16 and 17 are used, as is the preferred construction, with two sets of nozzles pointing in opposite directions, it is preferred to have each vane member provided on one side with projections 26 and on the opposite side with lugs 28, the lugs 28 on each member serving both as spacing lugs and means for receiving bolts 29 for fastening the vane members together.

While the preferred location for the main pipe line 4 is between the rails of a track so as to obviate the necessity for lateral pipes 7, still it may sometimes be desirable to locate the main pipe line 4 at one side of the track outside of the rails or between the tracks of a double track line. The only things to be observed in this connection are questions of maintenance of road bed, volume of traffic, amount of pipe required for one kind of installation as compared with another, etc., all of which are practical considerations to be settled by the specific local economic conditions affecting each particular installation, and are purely matters of general engineering knowledge and information, and no specific examples and calculations are necessary with respect thereto for a thorough and complete understanding of the present invention.

Figs. 4 to 8 inclusive of the drawings show a main pipe line 4, which may be either a main pipe line proper, like the pipe lines 4 shown by Figs. 1 and 2 of the drawings, or block supply pipes 8, such as are shown by Fig. 3 of the drawings, located parallel with and to one side of the rails 1 and 2 of a track, and this main supply pipe is provided with the lateral pipes 7, which are adapted to convey compressed air to the valve bodies 6 located between the rails 1 and 2 of the track shown, and similar valve bodies (not shown) located between the rails of an adjoining track (not shown). The valve bodies 6 are preferably supplied with two sets of nozzles 9, one nozzle for each series of vanes in the vane members, the nozzles of the two sets pointing in opposite directions lengthwise of the track and the passage of compressed air through said nozzles being controlled by a single valve for each set of nozzles.

The valve members 6 and the nozzles carried thereby should be spaced along the track according to the length of the vane members and according to traffic conditions. A car should always stand with a vane member over at least one set of nozzles, and at stations, or on up grades, the number of nozzles to a given length of track should be increased to make up for the extra tractive power required on the grade, and to enable the car or train to get up its speed with sufficient rapidity from a state of rest. On down grades on the other hand, the nozzles and valve members may be omitted entirely if the grade is sufficient to carry the cars down with the required speed, or only enough nozzles may be used to give the required speed, but on down grades it may be desirable to use the nozzles projecting in the direction opposite to the direction of travel in order to use them to stop the car should the brakes with which the car is provided for any reason fail, or should a special emergency stop be required.

The valve members of the preferred form are shown in cross section by Figs. 20 and 21 of the drawings, and they are composed of an elongated shell structure 290, with which the lateral pipes 7 communicate, and around the shell structure 290 and preferably cast integral therewith, are the chamber walls 30 and 31 which inclose chambers 32 and 33. Apertures 34, 35, 36 and 37 afford communication between chambers 32 and 33 and the interior of the member 290 and within these apertures 34, 35, 36 and 37 are preferably secured valve seats 38, 39, 40, 41, which are removably seated in said apertures, as for example by being screwthreaded therein as clearly shown by Figs. 20 and 21. Balanced puppet valves 42 and 43 engage with said valve seats, chambers 30 and 31 being provided with removable screwthreaded caps 44 and 45, which enable said valves to be removed and replaced and the valve seats to be removed and replaced. Springs 46 and 47 secured between the caps 44 and 45, and washers 48 and 49 on the stems of the valves 42 and 43, serve to retain said valves against their seats and to reseat them quickly after they have been opened, so as to avoid waste of compressed air.

The numerals 50 and 51 designate rocker arms provided with levers 52 within the chambers 32 and 33. The ends of said levers are bifurcated to receive the valve stems and are provided with notches within which are received pins 53 and 54 carried by the valve stems, as clearly shown by Figs. 20 and 21 of the drawings. The rocker arms 50 and 51 extend out from the chambers 30 and 31 and on their outer ends are provided with crank arms 55, 56, which open valves 42 and 43 when they are depressed. The nozzles 9 communicate with the chambers 32 and 33, as clearly shown by the drawings, and the nozzles communicating with chamber 32 point in one direction, and the nozzles communicating with chamber 33 point in the opposite direction.

While it is preferred to have the vane members carried by the trucks and supported by the equalizing bars, it is of course possible to support them in other ways, and they can if desired, be carried by a separate underframing supported by the equalizing bars or in any other way so as to always maintain the same distance from the nozzles, and they can be arranged the whole length of a car, either as one continuous vane member, or a vane member composed of a plurality of sections, according to convenience and the wishes of the user. In some cases it may be considered desirable to simply attach vane members outside the trucks to receive their supply of compressed air from pipes laid outside the rails and parallel thereto, and in Figs. 9, 10, 11, 12, 13, 14, 18 and 19 I have illustrated what I at present consider the preferred construction for this modified arrangement and location of the vane members.

Referring to Fig. 9, I have illustrated a train composed of three cars designated by the reference numerals 57, 58 and 59. The same numerals heretofore used designate the two rails of the track, and the numerals 60 and 61 designate two pipes laid parallel with the rails, and on opposite sides thereof, and sufficiently close thereto, so that the nozzles from valve bodies attached directly to said pipes may lie within the planes occupied by the vane members attached to the trucks. These valve bodies are designated by the numerals 62, and each valve body is provided with a downwardly extended projection 63, which is screwthreaded so as to screw directly into a screwthreaded aperture in a pipe 60 or 61. Each valve body is provided with partitions or webs 64, 65 and 66, which are preferably formed as integral parts of the casting which forms the valve body, and these partitions form two chambers 67 and 68 within the valve body, with which chambers the nozzles 69 and 70 respectively communicate. Said nozzles are preferably made of bent pieces of pipe screwed into the valve body 62, their ends being beveled off so as to lie in a horizontal plane, as clearly shown by Figs. 18 and 19 of the drawings. The partitions 64 and 65 are provided with apertures therethrough, the edges of which form valve seats, and puppet valves 71, 72, control the flow of air through said apertures from the interior of valve body 62 to the chambers 67 and 68 and consequently to nozzles 69 and 70. The valve body is provided with caps and stuffing boxes 73 and 74 through which the stems of the valves 71 and 72 project, and preferably these valve stems are provided with enlargements or heads, the valve stems proper being received within recesses in the ends of levers 75, 76, with the enlarged heads above said levers, as clearly shown by Figs. 18 and 19 of the drawings. The levers 75 and 76 are pivoted to a lug or standard 77 which projects upwardly from the top of the valve body, and the levers are inclined in the same directions that the nozzles which they respectively control extend. The levers 75 and 76 are preferably provided with outstanding contact arms 78 and 79 respectively, to be contacted by the skees to be presently described. By using two sets of nozzles, one on each side of the cars, as shown by Fig. 10, any tendency toward a side thrust is eliminated.

The vane members shown by Figs. 9 to 14, both inclusive, have two sets of vanes curved in opposite directions, so that the car can be sent either forward or backward, and it will be noticed by reference to Fig. 12 that the vanes which are curved so as to drive the car toward the right hand, are on the outside of vane member 80, but are inside on the vane member 81. The reason for this reversal of the position of the direction of the vanes in the vane members is to enable a car provided with the vane members on each side thereof to be run either backward or forward, irrespective of whether the car is turned end for end or not. For example, referring to Fig. 12, the nozzles projecting toward the right hand drive the car toward the right hand in the position of the car on the tracks as shown. If now the car be turned end for end on the tracks, the same nozzles projecting toward the right hand will drive air against vanes which are curved so as to drive the car toward the right hand just the same as before, while the nozzles pointing toward the left hand will drive the car toward the left hand the same as before. This same effect is accomplished with the preferred construction where the vane members are located between the rails in exactly the same way by providing two vane members 16 and 17 with the vanes therein curved in opposite directions, one vane member and one set of nozzles serving to drive the car in one direction, while the other vane member and the other set of nozzles are operative to propel the car in the opposite direction, and the car can be turned end for end on the tracks and still have a vane member operative with one set of nozzles to propel the car in one direction, and operative with the other set of nozzles to propel the car in the opposite direction.

When the vane members are supported outside of the trucks as shown by Figs. 9 to 14 inclusive, it is preferred to support them from the equalizing bars, for reasons heretofore stated, and they may be supported from the equalizing bars 82 by lugs or other suitable supporting means, and they may be braced by having pins 83, which are rigidly secured to the truck frames, pass through apertures in projections 84 and 85 at opposite ends of the vane members.

The contact arms 78 and 79 of levers 75 and 76 are intended to be depressed by skees to open valves 71 and 72 and said valves should have their upper disks large enough so that the pressure of the compressed air thereon acting in conjunction with gravity will close said valves. As levers 75 and 76 are inclined, as shown, the skees will run over them without injurious shock. In the preferred construction, however, the crank arms 55 and 56 are connected by links 86 and 87 with long levers 88 and 89 which are pivoted to standards 90 and 91 secured to ties 92 and 93, the free ends of said long levers being retained within guides 94 and 95, secured to ties 93 and 92. Springs 96 may be placed beneath the free ends of said long levers 88 and 89 to normally keep them in raised position and to relieve the springs 46 and 47 which close valves 42 and 43 from the weight of said levers. These springs 96 may be of the spiral, open or compression type and may be placed within the guides 94 and 95.

The long levers 88 and 89 are bent so that they present gradually inclined surfaces to the skees at both ends and their middle portions 97 are so inclined that when the levers are depressed by the skees their middle portions 97 are horizontal. As the valves 42 or 43 should be completely opened, to prevent throttling and wire drawing, when the skee passes upon the ends of the middle portions 97 of the long levers nearer the standards 90 and 91, to which said levers are pivoted, the valves 42 and 43 should be capable of overthrowing, or opening wider than theoretically necessary for full discharge capacity which is necessary to permit the middle portions 97 of the long levers to occupy a horizontal position, because these long levers are pivoted in a plane lower than that occupied by the skees when in their valve opening positions.

The skees for the preferred construction are designated by the numerals 98, 99, 100, 101, 102, 103, 104 and 105 (Figs. 4 to 8 inclusive) and each is composed of an elongated member turned up at both ends and preferably provided with a plurality of antifriction rollers 106, adapted to roll upon and over long levers 88 and 89, to depress them to open valves 42 and 43. One skee is provided for each vane member and the anti-friction rollers 106 are so spaced that before one leaves the middle portion 97 of a long lever 88 or 89 the one following is upon the middle portion 97. Each skee is attached to two rods, 107 and 108, so that it will be depressed evenly at each end, and these rods are held in position by lower and upper lugs 109, 110 projecting from the vane members. The rods 107 and 108 are freely movable up and down in apertures in said lugs 109, 110, and they and the skees are normally held in a raised position by springs 111 which bear against the upper surface of the lower lugs 109, and against washers, or plates 112, secured to said rods, as clearly shown by the drawings.

Compressed air is preferably employed for depressing the skees and compressed air for this purpose is stored in a tank 113, the supply being maintained by a pump 114 geared to an axle 15 of one of the trucks (Fig. 5) or in tanks 114 and 116 supplied by an axle driven pump 117. The compressed air is led from tank 113 by pipes 118 and 119 to engineer's valves 120, 121 located at the ends of a car. These engineer's valves are duplicates and a description of one, viz: valve 120 will be sufficient. The valve consists of a hollow cylindrical shell 122, into the center of the bottom of which supply pipe 118 from tank 113 leads. Within the shell 122 is a rotatable plug 123 to which the handle 124 is secured. The plug 123 is provided with an axial bore 125 which is in alinement with pipe 118 and always in open communication therewith and the plug is also provided with a radial port of sufficient circumferential extent to place supply pipe 118 in communication with skee pipe 126 and train pipe 127, or skee pipe 128 and train pipe 129 at the same time.

Numeral 130 designates an exhaust pipe. As the pipe leads from valves 120 and 121 are the same, the pipes are designated by the same reference characters.

The train pipes 127 and 129 are provided so that trailer cars (Fig. 5ª and cars 58 and 59 Figs. 9 and 10) can be coupled to a pilot car provided with valves 120 and 121 and the skees of the whole train controlled by the engineer by means of one engineer's valve. As the engineer's valves and their pipe leads are the same in both the preferred and modified constructions shown they are for convenience and simplicity designated by the same reference characters. The train pipes 131 and 132 carried by the trailers are adapted to be coupled with the train pipes 127 and 129 carried by the pilot car by means of hose connections 133 as shown and valves 134 are provided at each end of each train pipe on each car to prevent the compressed air escaping at the ends of the train. Each skee pipe 126 and 128, on the pilot car, and each train pipe, 131 and 132, carried by the trailers communicates with an auxiliary and for simplicity of description all auxiliaries on one side of a train are designated by the common reference numeral 135 and those on the other side of the train are designated by the common reference numeral 136. Each auxiliary in turn communicates with a skee cylinder and all skee cylinders on one side of the train are designated by the common reference numeral 137, while those on the other side of the train are designated by the common reference numeral 138. Each auxiliary consists of a cylinder 139 with an extension 140. Within the cylinder 139 is placed a bushing 141, provided with a groove 142 at its rear end, and within the cylinder 139, and bushing 141, is a movable piston 143, with a stem 144, which carries a valve 145, pressed to its seat by a spring 146. The extension 140 is connected with the skee cylinder 137, by the coupling 147, and the extension 140 is provided with an exhaust port 148, controlled by valve 145. Within skee cylinder 137 is a piston 149, forced in one direction by a spring 150, and adapted to be forced in the opposite direction against the tension of spring 150 by compressed air. The piston 149 is provided with a piston rod 151, which extends out through one end of cylinder 137, and is adapted to have a lever connected to the outer end thereof. The other end of the cylinder is provided with lugs 152 and 153, to which another lever may be secured.

The operation of this part of the apparatus is as follows: When compressed air is admitted into the cylinder 139 of the auxiliary by the manipulation of an engineer's valve, the piston 143 is forced to the left (Fig. 17) until the boss 154, on the rear face of the piston contacts with the rear of the cylinder and prevents further movement of the piston. When the piston is at this end of its stroke, valve 145 closes exhaust port 148, and there is a free but restricted passageway through groove 142 for the compressed air to pass from the front side of piston 143, to the rear thereof, and into cylinder 137 to push piston 149 out against tension of spring 150. The function of the groove 142 is to prevent the compressed air from entering cylinder 137 with a rush, when the engineer's valve is manipulated, and slamming the skees down hard. Owing to the restricted passageway for the compressed air through groove 142 the piston 149 moves gradually, and rather slowly, so that the skees are forced down gradually and are not liable to be injured. Cylinder 137 may be provided with an aperture 155 to maintain normal air pressure on the spring side of piston 149.

While it is desirable to apply or depress the skees gradually it is equally desirable that they be permitted to rise suddenly. Valve 145 and exhaust port 148 provide for this. When the plug 123 of the engineer's valve is turned so as to place pipe 128, for example, in communication with exhaust pipe 130, communication with the supply pipe 118 is cut off, and the air pressure in pipe 128 suddenly falls. The compressed air in cylinder 137, connection 147, and extension 140, immediately forces piston 143 to the right (Fig. 17) and the valve 145 uncovers exhaust port 148 permitting the air to exhaust suddenly from cylinder 137. The spring 150, forces piston 149 back quickly permitting the springs 111 to lift the skees with equal rapidity.

Separate skee pipes 126 and 128 are provided for the pilot car so that only the skees on the pilot car need be depressed according to the power required. An inspection of the engineer's valve (Fig. 16) shows that by turning the plug 123, clockwise, the supply pipe 118, is first placed in communication with skee pipe 128, and on further movement of the plug in the same direction, train pipe 129 is also placed in communication with supply pipe 118 so that not only the skees on the pilot car but also all the skees on the trailers will be depressed, thus making every car of the train a motor car, and each and all under the complete control of a single engineer. When the plug 123 is turned contra clockwise, either skee pipe 126, or both skee pipe 126 and train pipe 127, may be placed in communication with supply pipe 118 in a manner similar to that just described. The plug 123 is shown by Fig. 16 of the drawings in the lap position, that is, all communication is cut off between supply pipe 118 and pipes 126, 127, 128, 129, and it should be noted that in the lap position pipes 126, 127, 128 and 129 are all in free communication with the exhaust pipe 130. The exhaust pipe 130 can, of course, be omitted if desired as its only purpose is to lead the exhaust outside the car so that it will not be annoying.

Assuming that the ahead direction for the pilot car, shown by Fig. 5, and its trailer shown by Fig. 5ª, is to the right, then the vane members 17 are the forwardly driving vane members and the vane members 16 are the reversing or rearwardly driving vane members, and a contra clockwise movement of the handle 124 and plug 123 of the engineer's valve will cause the train to go forward and a clockwise movement of them will cause the train to back up. If the train is in motion it may be stopped by turning the handle 124 so as to depress the set of skees that would cause it to move in the direction opposite to its direction of motion.

The rods 107 and 108, to which the skees are secured, are forced down, when piston 149 (Fig. 17) is forced to the left by the compressed air, by very simple motion transmitting mechanism. Each piston 149 actuates a skee for each of the two trucks on a car. A lever 156 is fulcrumed at one end to lugs 152 and 153, on cylinder 137, and is pivoted at its other end to a rod 157, which in turn is pivoted to a crank arm 158 secured to a rocker rod 159 supported by a vane member. A second crank arm 160 secured to rocker rod 159 has its end extending over the upper end of one of the rods 107, 108 to which a skee is secured. A second crank arm 161 extends over the upper end of the other rod of the pair and is secured to a rocker arm 162 also supported by the same vane member, and this second rocker arm is connected with crank arm 158 by crank arm 163 and link 164, so that crank arms 160 and 161 and rods 107 and 108 move simultaneously and in unison.

To the end of piston rod 151, is pivoted one end of a floating lever 165, the other end of which is pivoted to a rod 166, which is connected to a crank arm 167, which is secured to a rocker arm 168, supported by a vane member and which in turn has secured thereto a crank arm 169, the end of which extends over the upper end of one of the pair of rods 107, 108, to which are secured the other skee, in the manner just described. The other rod of the pair has a crank arm 170, extending over its upper end and this crank arm is secured to a rocker arm 171, which is connected with crank arm 167 by crank arm 172 and link 173. Levers 156 and 165 are connected by a cylinder bar 174 pivoted to them between their ends in the same manner as with air brake apparatus so that the right hand skees (Figs. 5 and 5ª), or skees 98, 99, 102 and 103 will be depressed in unison with the left hand skees or skees 100, 101, 104 and 105. As the mechanisms for operating each other pair of skees are duplicates of those already described, they do not require to be described at length, and for simplicity, and to avoid confusion, the parts corresponding to those already described at length are not provided with reference characters on the drawings, as a mere inspection of the drawings is sufficient to identify the corresponding parts.

As the skee operating mechanisms used with the modified arrangement of apparatus are substantially duplicates of those already described, the same reference numerals are used on Figs. 9 to 13 of the drawings to designate the same elements which are used in both the preferred and the modified arrangement. In the modified arrangement of apparatus, however, two rocker rods 175 and 176 are used for each truck and each rocker rod 175 and 176 has two crank arms 177 and 178 and 179 and 180, respectively, secured thereto. Each crank arm 177, 178, 179 and 180 is loosely pivoted to a pressure bar 181, 182, 183 and 184 respectively, the ends of each pressure bar resting over and upon vertically disposed rods 185 which are secured to the skees 186, 187, 188 and 189 and which are reciprocable in lugs 190 and are normally held in elevated positions by springs 191 in the same manner as the similar rods 107 and 108 already described in detail.

The rocker rod 175 can depress two skees, one at each side of the truck, but an inspection of Fig. 12 of the drawings shows that each of said skees operates to open the proper valves to admit compressed air to the sets of vanes in the vane members 80 and 81 which propel the car in the same direction. In like manner the rocker rod 176 can depress two skees, one at each side of the truck, but these latter skees will open valves to admit compressed air to the other sets of vanes in the vane members 80 and 81 which are reversely curved so as to propel the car in the opposite direction.

The operation of the system and apparatus is as follows: A single car may be used or a plurality of cars may be coupled to form a train as illustrated and described. The cars may be and preferably should be provided with air brake mechanism and other car and train equipment (not shown because well known to all railroad men). The power house equipment and reheater plants may be of any desired or preferred type, all these matters being matters of general engineering information and not forming a part of this invention. By turning the handle 124 of the engineer's valve 120 clockwise or contra clockwise, skees are depressed to propel the car or train in one direction or the other as desired. To stop a car or train the handle is turned to the lap position and the brakes (not shown) are set in the ordinary manner. When a pilot car and trailers are coupled to form a train, the skees on the pilot car alone can be depressed or the skees on each and every car of the train can be depressed, thus regulating the power to the weight of the train, grades, etc.

By the use of this system lighter equipment can be used, resulting in less wear and tear on the road bed and rails. Heavy steam locomotives with their small tractive power are eliminated, as well as heavy electrical equipment, which also has small tractive power. The rails of the track become simply supporting and guiding elements and are not subject to the grinding, tractive effort of steam locomotives and electric traction. Each car becomes its own motor car, so that train lengths can be increased indefinitely and handled by one engineer the same as a single car and as each car is a motor car no more difficulty will be experienced in taking a long train around curves than a single car, and it will be impossible for a curve to stall a train as it can do when only a single locomotive furnished the tractive power. High speed can be maintained without pounding the track and road-bed to pieces, as there are no moving parts such as connecting rods, etc., to introduce difficulties of balancing.

Of course trailers which are not provided with vanes and skees can be coupled to a car or cars which are provided with vanes and skees and the train can be operated in the manner described, but unless all the cars of a train are provided with vanes and skees the full benefits and advantages of this system will not be realized, as will be perfectly obvious.

The air pipes may be laid under ground to avoid excessive changes of climatic temperatures and, generally speaking, installations should be made in accordance with good engineering practice and experience.

While I have illustrated and described the best and simplest mechanisms now known to me for practicing my invention, I am aware that many changes can be made without departing from the spirit and scope of my invention, and I, therefore, do not limit my invention to the specific arrangements and structures of apparatus illustrated and described.

What I claim is:

1. The combination with a track and a car movable thereon, of propelling vanes carried by the car for propelling it in one direction, other propelling vanes also carried by the car for propelling it in the opposite direction, nozzles adapted to direct compressed air against said vanes for propelling the car, a pipe to conduct compressed air to said nozzles, valves to control the flow of compressed air from said nozzles and skees carried by the car and operable therefrom to actuate said valves.

2. The combination with a track and a train movable thereon, said train being composed of a plurality of cars coupled together, of propelling vanes carried by each of said cars, nozzles adapted to direct compressed air against said vanes for propelling the cars, a pipe to conduct compressed air to said nozzles, valves to control the flow of compressed air from said nozzles, and a skee carried by each car, the skees carried by the several cars being operable from a single car to actuate said valves.

3. The combination with a track and a train movable thereon, said train being composed of a plurality of cars coupled together, of propelling vanes carried by each of said cars for propelling the car in one direction, other propelling vanes carried by each of said cars for propelling the car in the opposite direction, nozzles adapted to direct compressed air against said vanes for propelling the cars, a pipe to conduct compressed air to said nozzles, valves to control the flow of compressed air from said nozzles and a plurality of skees carried by each car, all the skees carried by the several cars being operable from a single car to actuate said valves.

4. The combination with the wheels and truck of a car of a vane member, provided with propelling vanes, carried thereby and so supported thereon that it maintains a predetermined fixed position with respect to said wheels.

5. The combination with a car of propelling vanes, a skee, a cylinder with a piston therein, motion transmitting mechanism connected to said piston for actuating said skee, an engineer's valve for supplying compressed air to said cylinder and adapted to permit it to exhaust therefrom and an auxiliary interposed between said cylinder and said engineer's valve, said auxiliary being provided with a restricted passage, a movable piston, an exhaust port for said cylinder and a valve secured to said movable piston for controlling said exhaust port.

6. The combination with a car of propelling vanes, skees, springs for normally holding said skees in a raised position and mechanism for depressing said skees.

7. The combination with a car of propelling vanes, a skee, a cylinder and piston for depressing said skee, a train pipe and an engineer's valve adapted to supply compressed air either to said cylinder alone or to both said cylinder and said train pipe.

In witness whereof I hereto affix my signature in presence of two witnesses.

JULIUS O. COBB.

Witnesses:
CHAS. L. GOSS,
FRANK E. DENNETT.